United States Patent

Moffitt

(10) Patent No.: US 7,150,314 B2
(45) Date of Patent: Dec. 19, 2006

(54) DUAL EXHAUST ENERGY RECOVERY SYSTEM

(75) Inventor: Ronnie R. Moffitt, Salvisa, KY (US)

(73) Assignee: American Standard International Inc., New York, NY (US)

(*) Notice: Subject to any disclaimer, the term of this patent is extended or adjusted under 35 U.S.C. 154(b) by 0 days.

(21) Appl. No.: 09/954,564

(22) Filed: Sep. 17, 2001

(65) Prior Publication Data

US 2003/0070787 A1    Apr. 17, 2003

(51) Int. Cl.
*F24F 11/04* (2006.01)
(52) U.S. Cl. ............................ 165/249; 165/8; 165/54; 454/237; 454/239
(58) Field of Classification Search ................ 165/7, 165/8, 10, 54, 86, 246; 454/67, 237, 239, 454/251, 252, 253; 62/132
See application file for complete search history.

(56) References Cited

U.S. PATENT DOCUMENTS

| | | | | |
|---|---|---|---|---|
| 4,426,853 A | * | 1/1984 | Mitani et al. | 165/8 |
| 4,509,583 A | * | 4/1985 | Raths | 165/8 |
| 4,542,782 A | * | 9/1985 | Berner | 165/7 X |
| 4,550,773 A | * | 11/1985 | Martin | 165/54 |
| 4,754,806 A | * | 7/1988 | Astle, Jr. | 165/10 X |
| 4,887,438 A | | 12/1989 | Meckler | |
| 4,896,716 A | * | 1/1990 | Sotani et al. | 165/54 |
| 4,982,575 A | * | 1/1991 | Besik | 165/7 X |
| 5,002,118 A | * | 3/1991 | Olmstead et al. | 165/54 |
| 5,003,961 A | | 4/1991 | Besik | |
| 5,005,556 A | * | 4/1991 | Astle, Jr. | 165/10 X |
| 5,024,263 A | * | 6/1991 | Laine et al. | 165/54 X |
| 5,117,563 A | * | 6/1992 | Castonguay | 165/54 X |
| 5,193,610 A | * | 3/1993 | Morissette et al. | 165/54 |
| 5,257,736 A | * | 11/1993 | Roy | 165/54 X |
| 5,282,770 A | * | 2/1994 | Shibata | 454/67 |
| 5,373,704 A | * | 12/1994 | McFadden | 62/94 |
| 5,426,953 A | * | 6/1995 | Meckler | 165/8 X |
| 5,490,557 A | * | 2/1996 | Taylor | 165/54 |
| 5,674,125 A | | 10/1997 | Xia et al. | |
| 5,761,908 A | * | 6/1998 | Oas et al. | 165/246 X |
| 6,141,979 A | * | 11/2000 | Dunlap | 165/8 X |
| 6,328,095 B1 | * | 12/2001 | Felber et al. | 165/8 |
| 6,401,802 B1 | * | 6/2002 | Cottingham | 165/54 |
| 6,973,795 B1 | * | 12/2005 | Moffitt | 62/132 |

FOREIGN PATENT DOCUMENTS

| | | | | |
|---|---|---|---|---|
| DE | 1 451 247 | * | 3/1969 | 165/7 |
| JP | 57-87591 | * | 6/1982 | 165/7 |
| SU | 320676 | * | 1/1972 | 165/7 |

OTHER PUBLICATIONS

Steven M. Spar, USPTO 2005-1533, Transaction from Russian of Author's Certificate No. 320,676, Dec. 29, 2004, pp. 1-2.*

* cited by examiner

*Primary Examiner*—Ljiljana Ciric
(74) *Attorney, Agent, or Firm*—William J. Beres; William O'Driscoll

(57) ABSTRACT

A heat recovery arrangement. The arrangement has a housing including a bathroom exhaust inlet, an exhaust outlet, a bathroom exhaust airflow path through the housing from the bathroom exhaust inlet to the exhaust outlet, a return air inlet, and a return air path through the housing from the return air inlet to the exhaust outlet. The housing also has an outside air inlet, a supply air outlet, an outside air path through the housing from the outside air inlet to the supply air outlet; and a heat recovery device extracting heat from the exhaust airflow path and the return airflow path and transferring heat to the outside airflow path.

21 Claims, 2 Drawing Sheets ic # DUAL EXHAUST ENERGY RECOVERY SYSTEM

BACKGROUND OF THE INVENTION

The present invention is directed to energy transfer between airstreams of a building and to recovery of heat energy being exhausted from a building. Particularly, the energy is recovered from or transferred to the exhaust of a bathroom system, and is preferably recovered in conjunction with the recovery of or transfer to energy from the building's return air stream.

Typical commercial buildings have minimum outside air ventilation requirements. Air handlers that are used in these buildings supply the building with air that is a mix of recirculated air and the required outside air. Such systems are sold by The Trane Company, a Division of American Standard Inc. under the trademarks Modular Climate Changer™ and may also be known in the industry as central station air handlers.

Schools and commercial buildings have two main sources of exhaust air: bathroom exhaust and system exhaust. The system exhaust is taken from the same air path as from the return airstream. The bathroom exhaust airflow amounts are dictated by local building codes. System exhaust airflows are the additional amount of air that must be removed from the building to keep the building from becoming overpressurized from the incoming outside ventilation air. To minimize the heating and cooling loads from the introduction of this outside air, energy can be recovered from the exhaust air by using and air-to-air heat exchanger such as an energy recovery wheel or an air-to-air plate heat exchanger.

A problem arises because previous energy recovery units recover energy from the system exhaust stream only. In part, this occurs because bathroom exhaust is an isolated airstream which is physically distinct from the supply air and return air streams providing air conditioning to the building. The end result is that a large percentage of energy is not recovered from a building exhaust airstream, because the bathroom exhaust airstream is ignored.

Also, the ratio of exhaust air to outside air is not optimal for the energy recovery device. This increases the payback time incurred from the cost of adding a heat recovery wheel or an air-to-air plate heat exchanger and adding an energy recovery function. This smaller ratio of exhaust air to outside air also increases the likelihood of frosting the energy recovery device during seasonal cold weather.

SUMMARY OF THE INVENTION

The present invention has an object, feature and advantage to solve the problems of previous systems.

The present invention has an object, feature and an advantage to providing a recovery air handling unit which can recover energy from both the bathroom exhaust and the system exhaust airstreams. It is a further object, feature and advantage of the present invention that this energy be recovered simultaneously from both streams using a single energy recovery device and a single exhaust fan.

It is an object, feature and advantage of the present invention to increase the amount of energy recovered from the exhaust airstream of a building and to reduce the operating costs incurred in doing so.

It is an object, feature and advantage of the present invention to reduce initial system costs by providing only a single exhaust fan in the exhaust airstreams of a building.

It is an object, feature and advantage of the present invention to increase the ratio of exhaust air to outside air.

It is a further object, feature and advantage of the present invention to reduce frost risks, particularly for plate-to-plate heat exchangers.

It is an object, feature and advantage of the present invention to provide a sectionalized energy recovery device.

It is a further object, feature and advantage of the present invention to provide a compact design which significantly reduces the required space needed and the requisite air handler costs.

It is an object, feature and advantage of the present invention to transfer energy from the outside airstream to the return air and bathroom exhaust airstreams during times of high ambient temperature, and to transfer energy from the return air and bathroom exhaust airstreams to the outside airstream during times of low ambient temperature.

It is an object, feature and advantage of the present invention to transfer excess energy from the outside airstream to the bathroom exhaust airstream and return airstream of a building.

The present invention provides a heat recovery arrangement. The arrangement includes a housing including a bathroom exhaust inlet, an exhaust outlet, a bathroom exhaust airflow path through the housing from the bathroom exhaust inlet to the exhaust outlet, a return air inlet, a return air path through the housing from the return air inlet to the exhaust outlet, an outside air inlet, a supply air outlet, and an outside air path through the housing from the outside air inlet to the supply air outlet. The arrangement also includes a heat recovery device extracting heat from the exhaust airflow path and the return airflow path, and transferring heat to the outside airflow path.

The present invention also provides a method of recovering energy. The method comprises the steps of: providing a bathroom exhaust airflow path to an air handler; providing a building exhaust airflow path to the air handler; providing an outside airflow path through the air handler; extracting heat from the system exhaust and bathroom exhaust airflow paths; and transferring the extracted heat to the outside air flow path.

The present invention further provides an energy recovery system. The energy recovery system includes a bathroom exhaust airstream path; a return airstream path; a divider wall between the bathroom exhaust airstream path and the return airstream path; an outside airstream path; and a heat transfer device transferring heat from the bathroom exhaust airstream and the return airstream path to the outside airstream flow path.

The present invention additionally provides an method of recovering energy. The method comprises the steps of: providing a bathroom exhaust airflow path to an air handler; providing a building exhaust airflow path to the air handler; providing an outside airflow path through the air handler; extracting heat from the outside air flow path and transferring the extracted heat to the system exhaust and bathroom exhaust airflow paths.

The present invention still further provides an energy recovery system comprising: a bathroom exhaust airstream path; a return airstream path; a divider wall between the bathroom exhaust airstream path and the return airstream path; an outside airstream path; and a heat transfer device transferring heat from the outside airstream flow path to the bathroom exhaust airstream and the return airstream path.

DETAILED DESCRIPTION OF THE DRAWINGS

Figure 1:
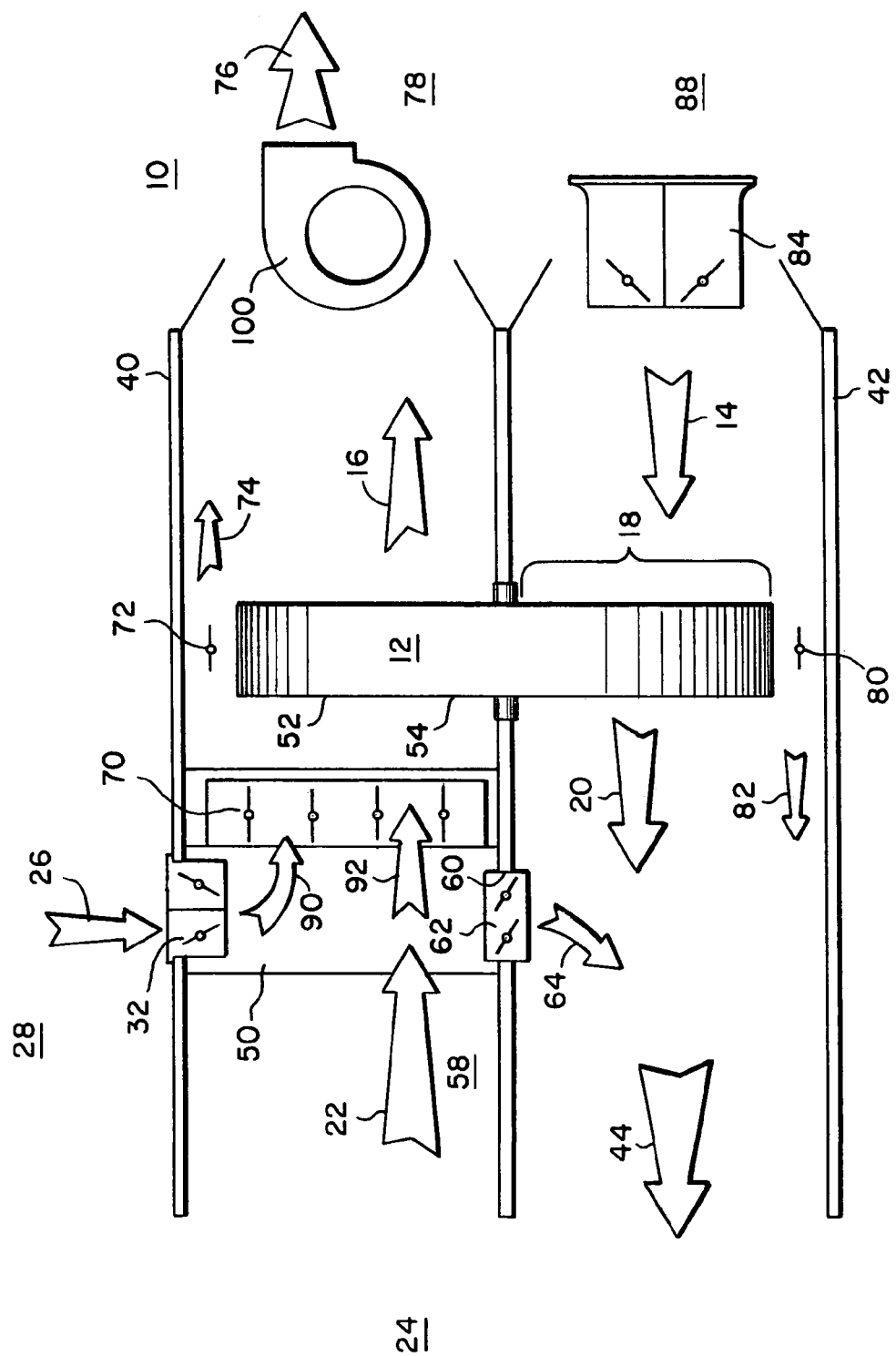
FIG. 1 is a diagram of a dual exhaust energy recovery system in accordance with the present invention.
Figure 3:
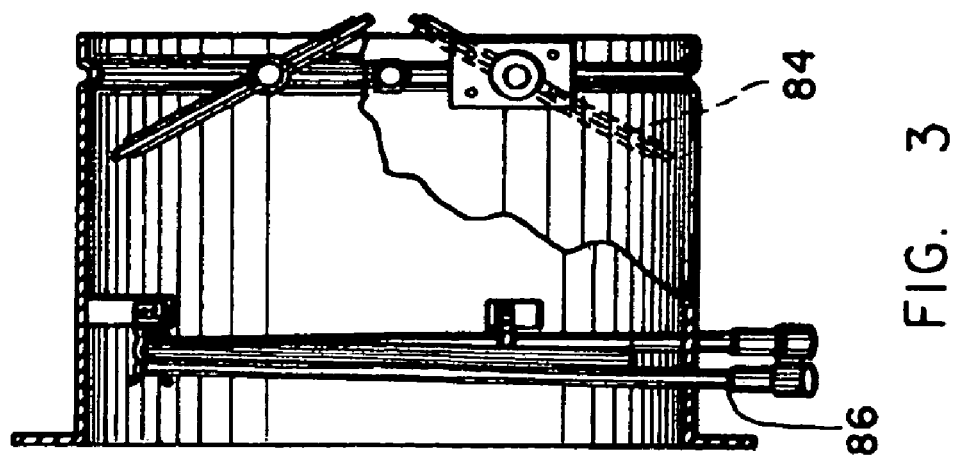
FIG. 3 is a side view of a damper and airflow sensor for outside airflow.
Figure 2:
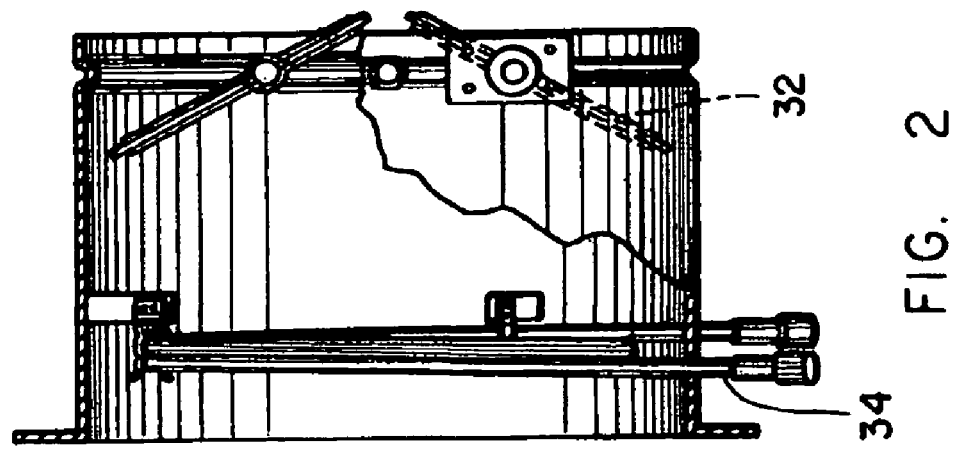
FIG. 2 is a side view of a damper and airflow monitor for bathroom exhaust airflow.

FIG. 1 shows the dual exhaust energy recovery system 10 of the present invention. The dual exhaust energy recovery system 10 includes an air-to-air heat exchanger 12 which is preferably implemented as a rotating energy recovery wheel but which may also be implemented as a plate heat exchanger or other conventional air-to-air heat exchanger. The air-to-air heat exchanger 12 exchanges heat between an outside airstream 14 and an exhaust airstream 16. The outside airstream 14 passes through a heat providing portion 18 of the heat exchanger 12, resulting in an outside airstream 20 whose temperature has been increased. The exhaust airstream 16 is a combination of a return airstream 22 from the building 24 whose air is being conditioned and a bathroom exhaust airstream 26 which is ducted from the bathrooms 28 of the building being conditioned. A damper 32 and an airflow monitor 34 are provided to control and confirm the amount of bathroom exhaust airflow 26 being removed from the bathrooms 28.

An exhaust airpath 40 is formed around the exhaust airstream 16, the return airstream 22 and the bathroom exhaust airstream 26. An outside air flow path 42 is formed around the outside airstreams 14, 20 and a supply airstream 44.

A divider wall 50 is provided in the exhaust airflow path 40 to segregate the bathroom exhaust airstream 26 from the return airstream 22 so that the bathroom exhaust 26 is directed to a first heat acquiring portion 52 of the heat exchanger 12 and the return airstream 22 is directed to a second heat acquiring portion 54 of the heat exchanger 12.

The return airside 58 of the exhaust airflow path 50 includes an aperture 60 and return air dampers 62 to modulate and allow a portion of the return airflow 64 to be diverted into the outside airflow path 42 and combined with the heated outside airstream 20 to result in the supply airstream 44. The supply airstream 44 is then directed to the space 24.

A relief damper 70 is provided in the return air portion to modulate the flow of the return airstream 22 prior to reaching the portion 54 of the heat exchanger 12.

Additionally, an exhaust air bypass damper 72 is provided in the flow path 40 to bypass a portion 74 of the exhaust air around the heat transfer device 12 if desired. The exhaust airstream 16 and the bypassed air 74 are combined into a building exhaust airstream 76 and exhausted from the building into an area of safe exhaust 78.

Similarly, an outside air bypass damper 80 is provided to bypass a portion 82 the outside airstream 14 around the heat transfer device 12. This portion 82 is combined with the heated outside airstream 20 and the bypassed return airstream 64 into the supply airstream 44.

The outside airflow path 42 includes a damper 84 and airflow sensor 86 to confirm and control the amount of outside air 88 introduced into the building. The present invention contemplates using the Traq™ dampers sold by The Trane Company of La Crosse, Wis., to provide the bathroom exhaust damper and monitor 34 and to provide the outside air damper 84 and monitor 86. Traq™ dampers are the subject of commonly assigned U.S. Pat. No. 5,674,125 to Xia et al. which is hereby incorporated by reference. Conventional face and bypass dampers are contemplated for the relief damper 70 and the bypass damper 62.

Essentially, the system 10 is sectionalized on the entering exhaust airside into the bathroom exhaust air stream 26 and the return airstream 22 by the divider wall 50. The bathroom exhaust airstream 22 enters its section 90 through the damper 32 and the airflow monitoring device 34. The airflow monitoring device 34 ensures that the required bathroom exhaust is maintained. The return airstream 22 enters its section 58 where some return air 64 exits through the return air damper 62 to be recirculated. The remaining return air 92 is the system exhaust air and passes through the relief damper 70 and then enters its portion 54 of the heat transfer device 12. The relief damper 70 works in conjunction with the bathroom exhaust damper 32 to balance the pressure between the bathroom exhaust airstream 26 and the return airstream and to help maintain the bathroom exhaust requirement. The airflows on the exhaust airside including the bathroom exhaust airstream 26 and the return airstream 22 are motivated by a single exhaust fan 100.

The present invention has been described in terms of winter conditions where the outside air is derived from low ambient temperature conditions and where energy can be saved by transferring recovered heat energy from the bathroom exhaust and the return airstream to the incoming outside airstream. Although this is the preferred embodiment, the present invention also contemplates the reverse situation where the outside ambient temperature is high. In such a situation, the incoming high temperature outside air is cooled by the transfer of energy to the relatively cooler return air and bathroom exhaust airstreams. The present invention will operate generally the same in either embodiment.

It will be apparent to a person of ordinary skill in the art that the invention may be modified or altered in a number of ways. Various air-to-air heat exchangers may be provided rather than the preferred energy wheel described in FIG. 1. Various dampers may be used and various airflow sensors may be used. All such modifications and alterations are contemplated to fall within the spirit and scope of the present invention.

What is desired to be secured as Letter Patent is set forth in the following claims.

The invention claimed is:

1. A heat recovery arrangement comprising:
   a building interior;
   a bathroom;
   an area of exhaust;
   a housing including a bathroom exhaust inlet operably connected to the bathroom, an exhaust outlet operably connected to the area of exhaust, a bathroom exhaust airflow path through the housing from the bathroom exhaust inlet to the exhaust outlet, a return air inlet operably connected to the building interior, a return airflow path through the housing from the return air inlet to the exhaust outlet, an outside air inlet, a supply air outlet operably connected to the building interior, and an outside air path through the housing from the outside air inlet to the supply air outlet; and
   a heat recovery device transferring heat between the bathroom exhaust airflow path, the return airflow path and the outside airflow path, where the heat recovery device extracts heat from the bathroom exhaust airflow path and from the return airflow path and transfers heat to the outside airflow path and wherein the heat recovery device includes a rotating energy recovery wheel arrangement such that the device sequentially extracts heat from the bathroom exhaust airflow path and from the return airflow path.

2. The arrangement of claim 1 where the heat recovery device extracts heat from the outside airflow path and transfers heat to the bathroom exhaust airflow path and to the return airflow path.

3. The arrangement of claim 1 wherein the heat transfer device includes a first portion for exchanging heat with the return airflow path and a second portion for exchanging heat with the bathroom exhaust airflow path.

4. The arrangement of claim 3 wherein the bathroom exhaust inlet includes a first modulating device.

5. The arrangement of claim 4 wherein the return air path includes a relief damper operable in conjunction with the first modulating device to balance the pressure between the bathroom exhaust airflow path and the return airflow path.

6. The arrangement of claim 5 wherein the outside air inlet includes a second modulating device.

7. The arrangement of claim 6 wherein a single exhaust fan provides a motivating force for air in both the bathroom exhaust airflow path and the return airflow path.

8. The arrangement of claim 1 wherein a single exhaust fan provides a motivating force for both the bathroom exhaust airflow path and the return airflow path.

9. An arrangement for recovering energy comprising:
a bathroom;
a building interior;
an area of exhaust;
an area of outdoor air;
a fan for moving air;
a bathroom exhaust airflow path from the bathroom through the fan to the area of exhaust;
a building exhaust airflow path from the building interior through the fan to the area of exhaust;
an outside airflow path from the area of outside air through the fan to the building interior; and
means for sequentially extracting heat from the building exhaust and from bathroom the exhaust airflow paths and for transferring the extracted heat to the outside air flow path.

10. The arrangement of claim 9 further including a divider wall between the bathroom exhaust airflow path and the building exhaust airflow path.

11. The arrangement of claim 10 wherein the extracting and transferring means include a rotating energy wheel.

12. The arrangement of claim 11 wherein the extracting means includes means for sequentially extracting heat first from the bathroom exhaust airflow path and then from the building exhaust airflow path.

13. The arrangement of claim 12 further including using the heated outside air to condition the building interior.

14. An energy recovery system comprising:
a bathroom;
a building interior;
an area of outside air;
an area of exhaust;
a bathroom exhaust airstream path operably connecting the bathroom and the area of exhaust;
a return airstream path operably connecting the building interior and the area of exhaust;
an outside airstream path operably connecting the area of outside air and the building interior; and
a heat transfer device configured to sequentially transfer heat from the bathroom exhaust airstream and from the return airstream path to the outside airstream flow path.

15. The system of claim 14 wherein the bathroom exhaust airstream airflow path includes an airflow control damper and an airflow monitor.

16. The system of claim 15 further including a relief damper to balance the pressure between the bathroom exhaust airstream path and the return airstream path.

17. The system of claim 16 further including a single exhaust fan providing a motivating force to air in both the bathroom exhaust airflow stream path and the return airstream airflow path.

18. An energy recovery system comprising:
a bathroom;
a building interior;
an area of outside air;
an area of exhaust;
a bathroom exhaust airstream path operably connecting the bathroom and the area of exhaust;
a return airstream path operably connecting the building interior and the area of exhaust;
an outside airstream path operably connecting the area of outside air and the building interior; and
a heat transfer device configured to transfer heat from the outside airstream flow path sequentially to the bathroom exhaust airstream and to the return airstream path.

19. The system of claim 18 wherein the bathroom exhaust airstream airflow path includes an airflow control damper and an airflow monitor.

20. The system of claim 19 further including a relief damper to balance the pressure between the bathroom exhaust airstream path and the return airstream path.

21. The system of claim 20 further including a single exhaust fan providing a motivating force to both air in the bathroom exhaust airflow stream path and the return airstream airflow path.

* * * * *